(12) United States Patent
Coffin

(10) Patent No.: US 8,727,935 B2
(45) Date of Patent: May 20, 2014

(54) FAN DRIVE GEAR SYSTEM TORQUE FRAME PIN RETAINER

(75) Inventor: James B. Coffin, Windsor, CT (US)

(73) Assignee: United Technologies Corporation, Hartford, CT (US)

( * ) Notice: Subject to any disclaimer, the term of this patent is extended or adjusted under 35 U.S.C. 154(b) by 294 days.

(21) Appl. No.: 13/561,176

(22) Filed: Jul. 30, 2012

(65) Prior Publication Data

US 2014/0031163 A1    Jan. 30, 2014

(51) Int. Cl.
  *F16H 57/08* (2006.01)
(52) U.S. Cl.
  USPC .................................................. 475/346
(58) Field of Classification Search
  USPC .................. 475/331, 346; 60/226.1
  See application file for complete search history.

(56) References Cited

U.S. PATENT DOCUMENTS

| | | | |
|---|---|---|---|
| 5,102,379 A | 4/1992 | Pagluica et al. | |
| 5,466,198 A | 11/1995 | McKibbin et al. | |
| 5,470,286 A | 11/1995 | Fan | |
| 5,935,038 A | 8/1999 | Woytaszek | |
| 6,223,616 B1 * | 5/2001 | Sheridan | 74/468 |
| 6,254,505 B1 | 7/2001 | Forrest | |
| 6,574,892 B2 | 6/2003 | Creighton | |
| 6,663,530 B2 | 12/2003 | Poulin et al. | |
| 7,104,918 B2 | 9/2006 | Mitrovic | |
| 7,223,197 B2 | 5/2007 | Poulin et al. | |
| 7,883,439 B2 * | 2/2011 | Sheridan et al. | 475/159 |
| 7,926,260 B2 * | 4/2011 | Sheridan et al. | 60/226.1 |
| 8,276,275 B2 * | 10/2012 | Sheridan et al. | 29/893.1 |
| 2003/0162630 A1 | 8/2003 | Poulin et al. | |
| 2009/0111639 A1 * | 4/2009 | Klingels | 475/347 |
| 2010/0105516 A1 | 4/2010 | Sheridan et al. | |
| 2010/0154217 A1 | 6/2010 | Sheridan et al. | |
| 2010/0247015 A1 | 9/2010 | Montagu et al. | |

FOREIGN PATENT DOCUMENTS

JP          09060633 A          3/1997

OTHER PUBLICATIONS

U.S. Appl. No. 13/429,671, filed Mar. 26, 2012, "Torque Frame Bushing Arrangement for Gas Turbine Engine Fan Drive Gear System".
U.S. Appl. No. 13/095,308, filed Apr. 27, 2011, "Fan Drive Planetary Gear System Integrated Carrier and Torque Frame".
U.S. Appl. No. 13/095,324, filed Apr. 27, 2011, "Fan Drive Gear System Integrated Carrier and Torque Frame".
International Search Report and Written Opinion for International Application No. PCT/US2013/047533 completed on Oct. 4, 2013.

* cited by examiner

*Primary Examiner* — Dirk Wright
(74) *Attorney, Agent, or Firm* — Carlson, Gaskey & Olds, P.C.

(57) ABSTRACT

A system and method for fixing a fan drive gear system carrier to a torque frame are disclosed. The carrier and torque frame respectively have a hole and an aperture which are aligned with one another. A retainer pin is inserted in to the aligned hole and aperture in an interference fit relationship with at least one of the hole and aperture.

24 Claims, 4 Drawing Sheets

FAN DRIVE GEAR SYSTEM TORQUE FRAME PIN RETAINER

BACKGROUND

This disclosure relates to a retainer for a torque frame pin in a fan drive gear system.

One type of gas turbine engine includes a fan drive gear system that is interconnected between a spool of a core engine and a fan. One example the fan drive gear system is provided by an epicyclic gear train and includes a centrally located input gear driven by the spool, intermediate gears circumferentially arranged about and intermeshing with the input gear and a ring gear provided about and intermeshing the intermediate gears. The intermediate gears are mounted within a carrier, which is supported by a torque frame. Depending upon the configuration, either the torque frame or the ring gear rotationally drives the fan via a fan shaft in response to rotation of the input gear.

Each of the intermediate gears are supported in the carrier by a journal extending between spaced apart walls of the carrier. The carrier is typically constructed from a high strength metallic alloy such as steel, titanium or nickel. The torque frame is typically fixed to the carrier by a flexural pin. This pin serves two functions. First, the pin ensures that lubrication passages associated with the torque frame and carrier are properly aligned. Second, the pin precisely locates the torque frame and carrier in the desired position. The flexural pin is made from case hardened steel, such as Nitralloy® and is held in place by a retainer pin. The retainer pin is made from a deep-hardened steel alloy that can withstand high service temperatures and high stresses. Owing to its properties and material compatibility with nitrided steels, a 418 stainless steel, such as Greek Ascoloy®, is frequently chosen.

In current torque frame retention designs, the retainer pin is a unitary structure that is threaded at one end. The threaded end is received by a correspondingly threaded hole in the carrier. The other end is a cylindrical portion that is received in a slip fit relationship by a corresponding aperture in the flexural pin to align the flexural pin in a desired orientation.

The retainer pin is a high-cost part that is difficult to manufacture and is susceptible to deformation upon installation due to existing tolerances. Assembly and disassembly of the fan drive gear system currently requires torqueing the retainer. During torqueing, the retainer pin may break if the cylindrical portion of the retainer pin binds to the flexural pin. The retainer pin may then need to be removed by electrical discharge machining, which could render the carrier unusable. Additionally, it is beneficial to avoid threading a Greek Ascoloy part.

SUMMARY

In one exemplary embodiment, an epicyclic gear train carrier assembly includes a carrier that receives a flexure pin. The carrier and the flexure pin respectively include a hole and an aperture aligned with one another. A retainer pin is arranged in the hole and the aperture with the retainer pin in an interference fit relationship with at least one of the hole and the aperture.

In a further embodiment of any of the above, the retainer pin is made of a hardened stainless steel.

In a further embodiment of any of the above, the epicyclic gear further includes a fastener arranged in the hole.

In a further embodiment of any of the above, the fastener is a bolt that is at least partially threaded.

In a further embodiment of any of the above, the hole has first and second ends. The first and second ends are accessible from an outside diameter of the carrier.

In a further embodiment of any of the above, the hole has a first diameter on the first end and a second diameter on the second end. The second diameter is less than the first diameter.

In a further embodiment of any of the above, the first diameter is greater than a diameter of the retainer pin at room temperature and the second diameter is less than the diameter of the retainer pin at room temperature.

In a further embodiment of any of the above, the retainer pin has an end that abuts a stop in the aligned hole and aperture to prevent axial movement of the retainer pin in one direction.

In another exemplary embodiment, an epicyclic gear train carrier assembly includes a carrier receiving a flexure pin. The carrier and the flexure pin respectively include a hole and an aperture aligned with one another. A retainer pin is arranged in the hole and the aperture. A fastener is arranged in the hole to secure the retainer pin.

In a further embodiment of any of the above, the hole has a first end with a first diameter to accept the fastener, and a second end with a second diameter to accept the retainer pin. The second diameter is less than the first diameter.

In a further embodiment of any of the above, the second diameter is less that the diameter of the retainer pin at room temperature.

In another exemplary embodiment, a fan drive gear system includes a carrier. An intermediate gear is supported by the carrier. An input gear is supported by the carrier. A ring gear surrounds the intermediate gear. A torque frame has a projection. The torque frame projection is fixed to the carrier with a flexure pin. The carrier and the flexure pin respectively have a hole and an aperture aligned with one another. A retainer pin is arranged in the hole and the aperture with the retainer pin in an interference fit relationship with at least one of the hole and the aperture.

In a further embodiment of any of the above, the hole has first and second ends. The first and second ends are accessible from an outside diameter of the carrier.

In a further embodiment of any of the above, the hole has a first diameter on the first end and a second diameter on the second end. The second diameter is less than the first diameter.

In a further embodiment of any of the above, the first diameter is greater than a diameter of the retainer pin at room temperature and the second diameter is less than the diameter of the retainer pin at room temperature.

In a further embodiment of any of the above, the retainer pin has an end that abuts a stop in the aligned hole and aperture to prevent axial movement of the retainer pin in one direction.

In a further embodiment of any of the above, the carrier supports multiple circumferentially spaced intermediate gears and the torque frame has multiple circumferentially spaced projections secured to the carrier.

In another exemplary embodiment, a fan drive gear system includes a carrier. An intermediate gear is supported by the carrier. An input gear is supported by the carrier. A ring gear surrounds the input gear. A torque frame has a projection. The torque frame projection is fixed to the carrier with a flexure pin. The carrier and the flexure pin respectively have a hole and an aperture aligned with one another. A retainer pin with a diameter is arranged in the hole and the aperture. A fastener is arranged in the hole to secure the retainer pin.

In a further embodiment of any of the above, the hole has a first end with a first diameter to accept the fastener, and a second end with a second diameter to accept the retainer pin. The second diameter is less than the first diameter.

In a further embodiment of any of the above, the second diameter is less than the diameter of the retainer pin at room temperature.

In a further embodiment of any of the above, the carrier supports multiple circumferentially spaced intermediate gears and the torque frame has multiple circumferentially spaced projections secured to the carrier.

In another exemplary embodiment, a method of assembling a fan drive gear system torque frame and carrier includes the steps of axially aligning an aperture formed in a flexure pin with a hole formed in a fan drive gear system carrier, inserting a retainer pin into the aligned hole and aperture, and securing a fastener into a first end of the aligned hole and aperture subsequent to performing the inserting step.

In a further embodiment of any of the above, the securing step is accomplished by separately threading the fastener into the first end of the aligned hole and aperture subsequent to performing the inserting step.

In a further embodiment of any of the above, the step of inserting the retainer pin provides a slip fit relationship between the retainer pin and the fan drive gear system carrier.

BRIEF DESCRIPTION OF THE DRAWINGS

The disclosure can be further understood by reference to the following detailed description when considered in connection with the accompanying drawings wherein.

DETAILED DESCRIPTION

Figure 1:
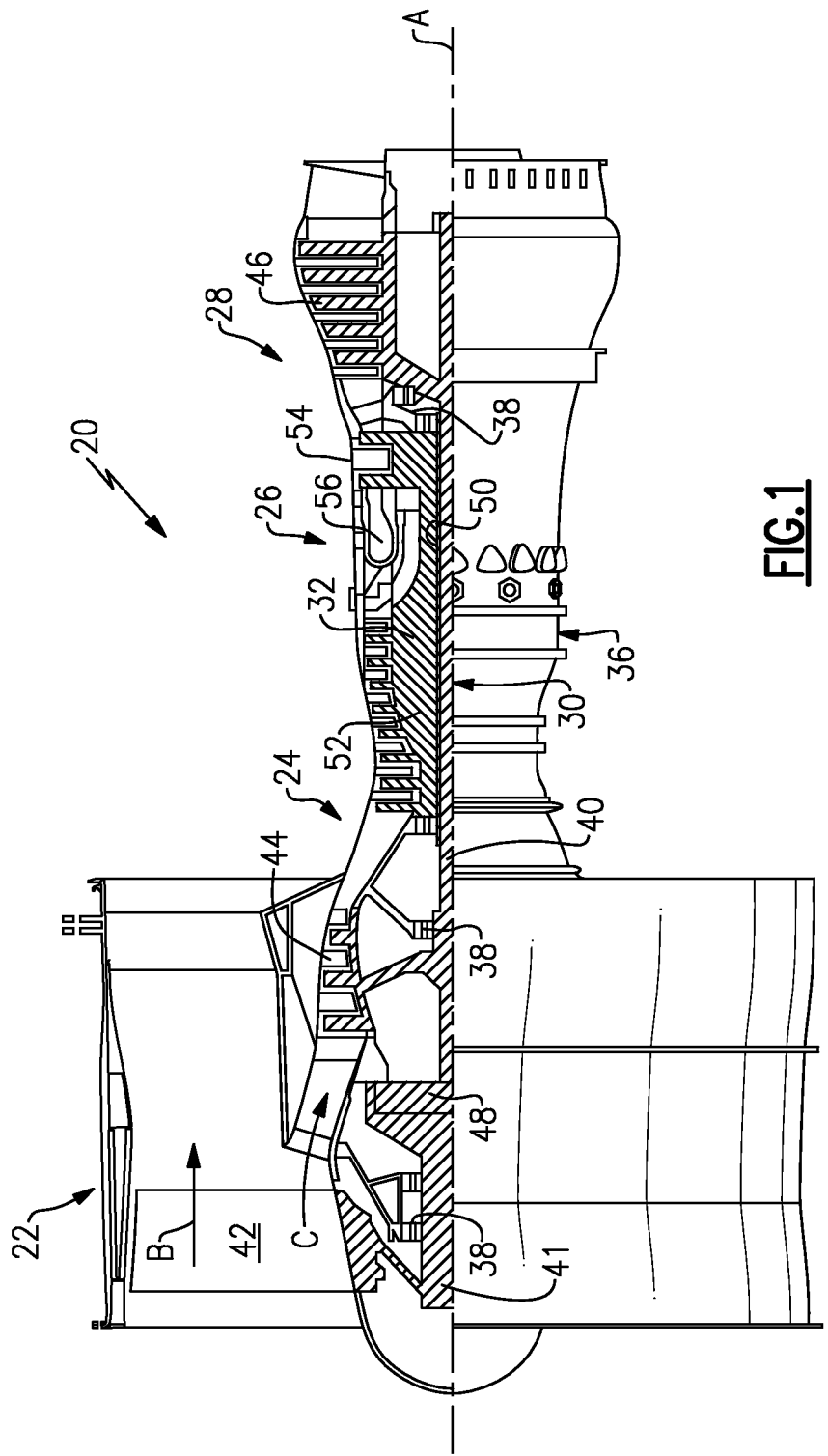
FIG. 1 is a schematic cross-sectional view of an example gas turbine engine.

FIG. 1 schematically illustrates an example gas turbine engine 20 that includes a fan section 22, a compressor section 24, a combustor section 26 and a turbine section 28. Alternative engines might include an augmenter section (not shown) among other systems or features. The fan section 22 drives air along a bypass flow path B while the compressor section 24 draws air in along a core flow path C where air is compressed and communicated to a combustor section 26. In the combustor section 26, air is mixed with fuel and ignited to generate a high pressure exhaust gas stream that expands through the turbine section 28 where energy is extracted and utilized to drive the fan section 22 and the compressor section 24.

Although the disclosed non-limiting embodiment depicts a turbofan gas turbine engine, it should be understood that the concepts described herein are not limited to use with turbofans as the teachings may be applied to other types of turbine engines; for example a turbine engine including a three-spool architecture in which three spools concentrically rotate about a common axis and where a low spool enables a low pressure turbine to drive a fan via a gearbox, an intermediate spool that enables an intermediate pressure turbine to drive a first compressor of the compressor section, and a high spool that enables a high pressure turbine to drive a high pressure compressor of the compressor section.

The example engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided.

The low speed spool 30 generally includes an inner shaft 40 that connects a fan 42 and a low pressure (or first) compressor section 44 to a low pressure (or first) turbine section 46. The inner shaft 40 drives the fan 42 through a speed change device, such as a geared architecture 48, to drive the fan 42 at a lower speed than the low speed spool 30. The high-speed spool 32 includes an outer shaft 50 that interconnects a high pressure (or second) compressor section 52 and a high pressure (or second) turbine section 54. The inner shaft 40 and the outer shaft 50 are concentric and rotate via the bearing systems 38 about the engine central longitudinal axis A.

A combustor 56 is arranged between the high pressure compressor 52 and the high pressure turbine 54. In one example, the high pressure turbine 54 includes at least two stages to provide a double stage high pressure turbine 54. In another example, the high pressure turbine 54 includes only a single stage. As used herein, a "high pressure" compressor or turbine experiences a higher pressure than a corresponding "low pressure" compressor or turbine.

The core airflow C is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path. The turbines 46, 54 rotationally drive the respective low speed spool 30 and high speed spool 32 in response to the expansion.

The engine 20 in one example is a high-bypass geared aircraft engine. In a further example, the engine 20 bypass ratio is greater than about six (6), with an example embodiment being greater than ten (10), the geared architecture 48 is an epicyclic gear train, such as a star gear system or other gear system, with a gear reduction ratio of greater than about 2.3 and the low pressure turbine 46 has a pressure ratio that is greater than about 5. In one disclosed embodiment, the engine 20 bypass ratio is greater than about ten (10:1), the fan diameter is significantly larger than that of the low pressure compressor 44, and the low pressure turbine 46 has a pressure ratio that is greater than about 5:1. Low pressure turbine 46 pressure ratio is pressure measured prior to inlet of low pressure turbine 46 as related to the pressure at the outlet of the low pressure turbine 46 prior to an exhaust nozzle. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet. The flight condition of 0.8 Mach and 35,000 ft, with the engine at its best fuel consumption—also known as "bucket cruise Thrust Specific Fuel Consumption ('TSFCT')"—is the industry standard parameter of lbm of fuel being burned per hour divided by lbf of thrust the engine produces at that minimum point. "Fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(\text{Tambient deg R})/518.7)^{\wedge}0.5]$. The "Low corrected fan tip speed" as disclosed herein according to one non-limiting embodiment is less than about 1150 ft/second.

Figure 2:
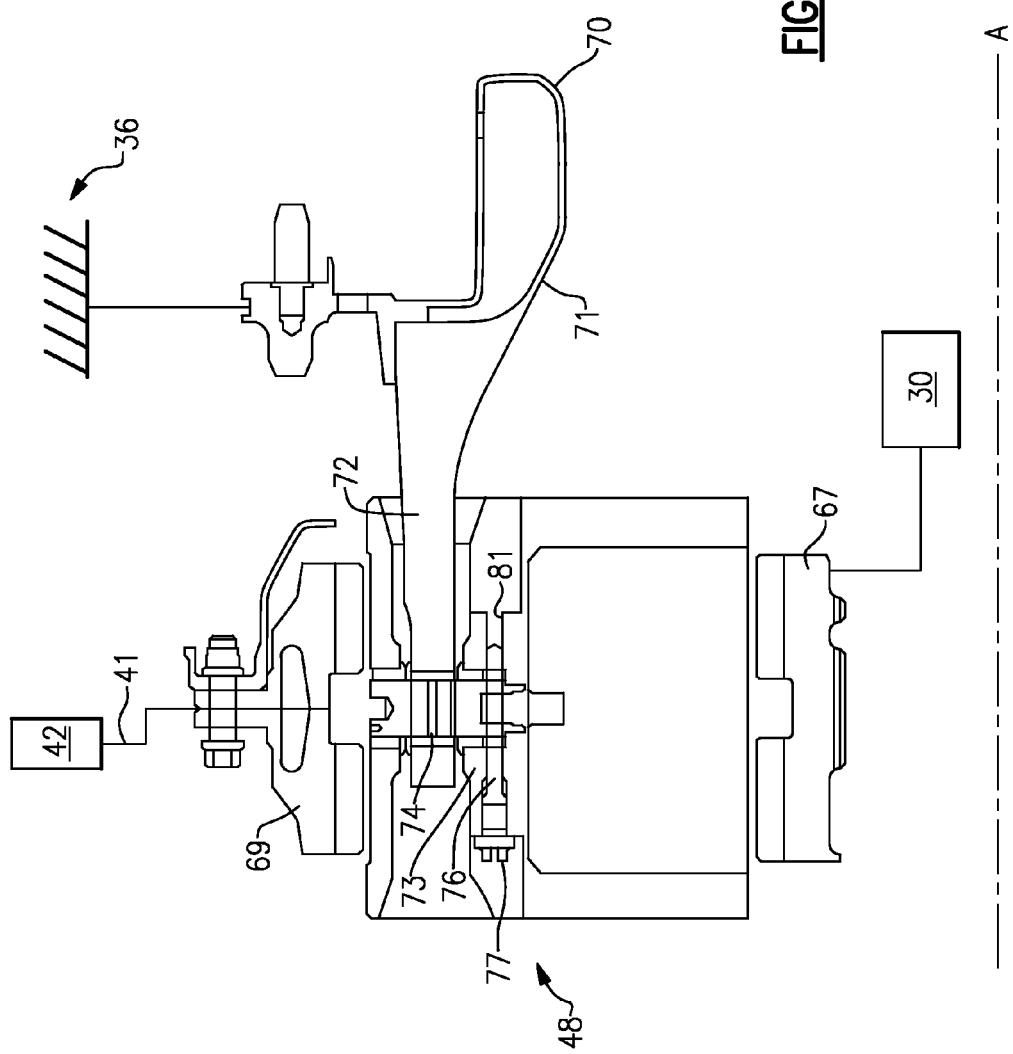
FIG. 2 is a schematic cross-sectional view of an example fan drive gear system.
Figure 3:
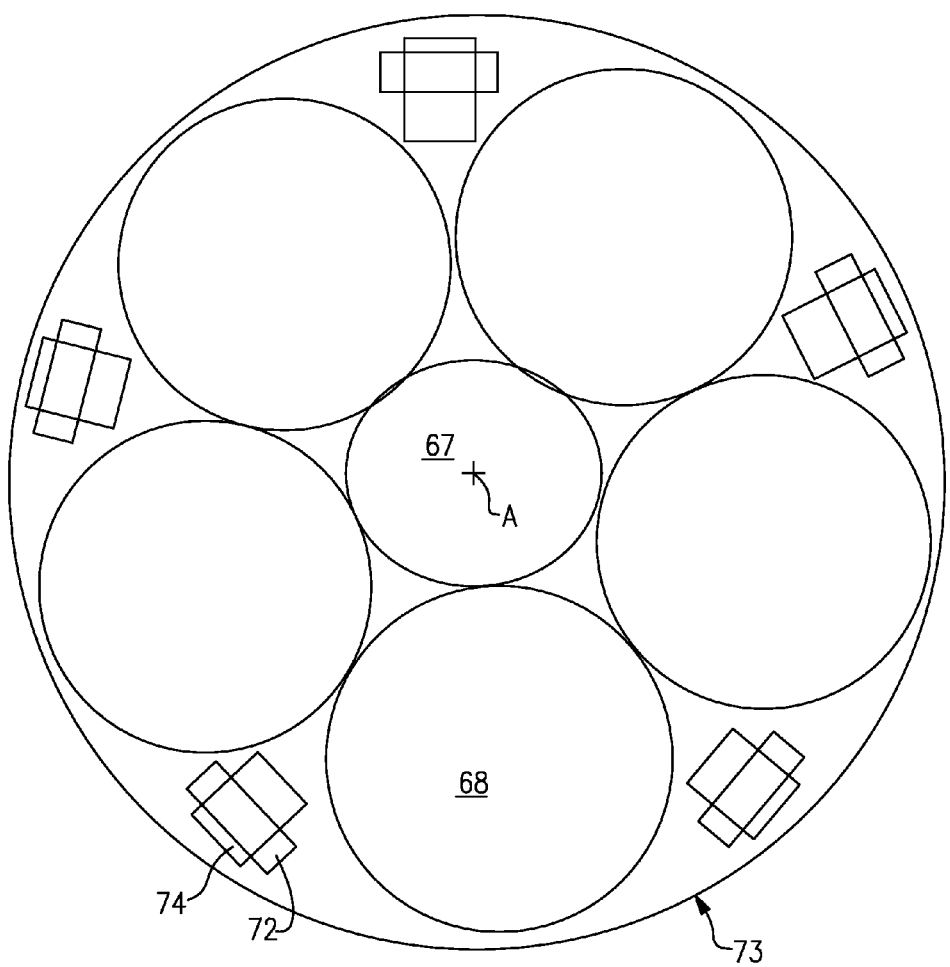
FIG. 3 is a schematic view of the fan drive gear system carrier.

One example epicyclic gear train 48, a star configuration, is illustrated in FIGS. 2 and 3. The low pressure spool 30 rotationally drives an input gear 67 about an axis A. Intermediate gears 68 are arranged circumferentially about and intermesh with the input gear 67. A ring gear 69 surrounds and intermeshes with the intermediate gears 68. Either the intermediate gears 68 (via a torque frame 71) or the ring gear 69 rotationally drives a fan shaft 41 (FIGS. 1 and 2) depending upon the type of epicyclic gear train configuration. In the example star configuration shown, the ring gear 69 rotationally drives the fan 42 via the fan shaft 41.

The example epicyclic gear train 48 is the type in which the intermediate gears 68 are rotationally fixed relative to the rotational axis of the input gear 67. That is, the star gears are permitted to rotate about their respective rotational axes but do not rotate about the rotational axis of the input gear 67. The engine static structure 36 includes a flex support 70. The torque frame 71 is affixed to the flex support 70 to prevent rotation of the torque frame 71 about the rotational axis A of the input gear 67. However, it should be understood that in a planetary configuration the torque frame 71 would rotate about the rotational axis A and the ring gear 69 would be coupled to the engine static structure 36.

The torque frame 71 includes multiple projections 72. In one example shown in FIG. 3, the torque frame 71 includes five equally circumferentially spaced projections 72 secured to the carrier 73 circumferentially between the intermediate gears 68. The torque frame 71 is fixed to the carrier 73 by means of a flexure pin 74.

Figure 4:
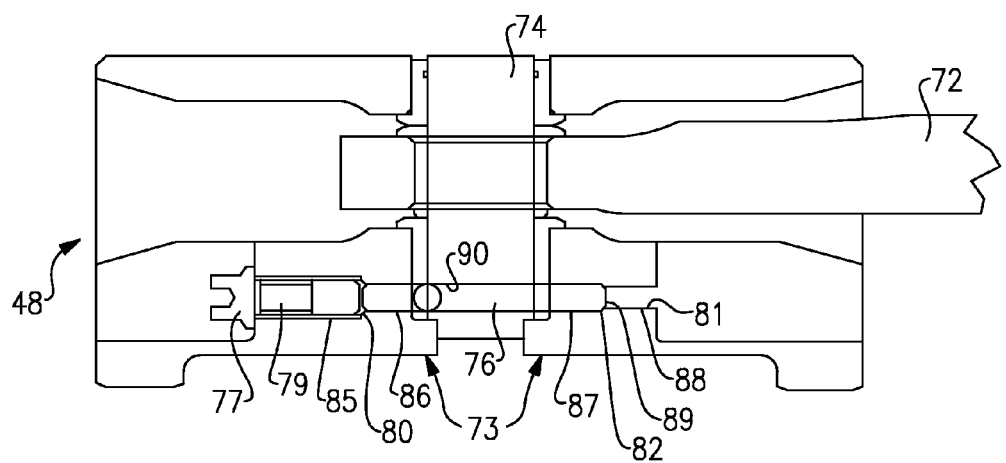
FIG. 4 is an enlarged view a portion of the fan drive gear system in FIG. 2.

Referring to FIGS. 3 and 4, the flexure pin 74 is held in place with a retainer pin 76. The flexure pin 74 has an aperture 90 formed perpendicular to its axis at one end. The aperture 90 can be a hole or a slot, for example. The aperture 90 in the flexure pin 74 is aligned with a corresponding hole 81 in the carrier 73. The hole 81 in the carrier 73 has two ends that are accessible from outside the carrier 73. That is, the hole 81 completely extends axially through a portion of the carrier 73. The hole 81 and aperture 90 are coaxial and are axially aligned to form a passage to accept a retainer pin 76. The retainer pin 76 is inserted into the axially aligned hole 81 and the aperture 90 from one side of the carrier 73. Thus, the retainer pin 76 is perpendicular to the flexural pin 74 when installed. The retainer pin 76 can be made of a 418 stainless steel, such as Greek Ascoloy® or another hard metallic alloy, and has a smooth cylindrical surface. The retainer pin 76 is axially slidable with respect to the aligned hole 81 and the aperture 90. Additionally, the retainer pin 76 is unthreaded and can be inserted into the aligned hole 81 and the aperture 90 without rotation.

The axially aligned hole 81 and the aperture 90 together form a passage with the first, second, third and fourth portions 85-88. In one example, the first portion 85 of the aligned hole 81 and the aperture 90 can accept a fastener 77. In one example, the fastener 77 is a threaded fastener, such as a bolt, having a threaded portion 79. The bolt can be a standard bolt that is currently used in other turbo machinery parts. The second portion 86 of the aligned hole 81 and the aperture 90 can have a diameter less than the diameter of the first portion 85. This forms a stop 80 at one end of the first portion 85.

In one example, the diameter of the second portions 86 is larger than the diameter of the retainer pin 76 at room temperature to allow for a slip fit relationship. The third portion 87 has a diameter less than the diameter of the retainer pin 76 at room temperature to allow for an interference fit relationship. The fourth portion 88 has a diameter less than the diameter of the third portion 87. This forms a stop 82 at one end of the third portion 86, which abuts the end 89 of the retainer pin 76 and prevents the retainer pin 76 from sliding past a desired point during insertion of the retainer pin 76 into the carrier 73.

The retainer pin 76 can be installed in the torque frame 71 and the flexure pin 74 by aligning the hole 81 in the carrier 73 with the aperture 90 in the flexure pin 74. The retainer pin 76 can then be inserted into the first portion 85 of the aligned hole 81 and the aperture 90 and an axial load can be applied to the retainer pin 76 using a press tool or drift to push the retainer pin 76 through the second portion 86 and the third portion 87 until the retainer pin 76 bottoms out on the stop 82. In one example, a fastener 77 can then be installed in the first portion 85 of the aligned hole 81 and the aperture 90 to prevent the retainer pin from backing out during engine operation.

The fastener 77 is removed to remove the retainer pin 76 from the torque frame 71 and the flexure pin 74. A tool can be inserted into the fourth portion 88 of the aligned hole Bland the aperture 90 at the side of the carrier 73 opposite the fastener 77. The tool is used to apply an axial load to the retainer pin 76. The retainer pin 76 can thus be pushed through the aligned hole 81 and the aperture 90 and removed from the first portion 85.

Although an example embodiment has been disclosed, a worker of ordinary skill in this art would recognize that certain modifications would come within the scope of the claims. For that reason, the following claims should be studied to determine their true scope and content.

What is claimed is:

1. An epicyclic gear train carrier assembly comprising:
   a carrier receiving a flexure pin, the carrier and the flexure pin respectively including a hole and an aperture aligned with one another; and
   a retainer pin arranged in the hole and the aperture with the retainer pin in an interference fit relationship with at least one of the hole and the aperture.

2. The epicyclic gear train carrier assembly of claim 1, wherein the retainer pin is made of a hardened stainless steel.

3. The epicyclic gear train carrier assembly of claim 1, further including a fastener arranged in the hole.

4. The epicyclic gear train carrier assembly of claim 3, wherein the fastener is a bolt that is at least partially threaded.

5. The epicyclic gear train carrier assembly of claim 1, wherein the hole has first and second ends, the first and second ends being accessible from an outside diameter of the carrier.

6. The epicyclic gear train carrier assembly of claim 5, wherein the hole has a first diameter on the first end and a second diameter on the second end, the second diameter being less than the first diameter.

7. The epicyclic gear train carrier assembly of claim 6, wherein the first diameter is greater than a diameter of the retainer pin at room temperature and the second diameter is less than the diameter of the retainer pin at room temperature.

8. The epicyclic gear train carrier assembly of claim 1, wherein the retainer pin has an end that abuts a stop in the aligned hole and aperture to prevent axial movement of the retainer pin in one direction.

9. An epicyclic gear train carrier assembly comprising:
   a carrier receiving a flexure pin, the carrier and the flexure pin respectively including a hole and an aperture aligned with one another;
   a retainer pin arranged in the hole and the aperture; and
   a fastener arranged in the hole to secure the retainer pin.

10. The epicyclic gear train carrier assembly of claim 9, wherein the hole has a first end with a first diameter to accept the fastener, and a second end with a second diameter to accept the retainer pin, the second diameter being less than the first diameter.

11. The epicyclic gear train carrier assembly of claim 10, wherein the second diameter is less that the diameter of the retainer pin at room temperature.

12. A fan drive gear system comprising:
a carrier;
an intermediate gear supported by the carrier;
an input gear supported by the carrier;
a ring gear surrounding the intermediate gear;
a torque frame having a projection, the torque frame projection fixed to the carrier with a flexure pin, the carrier and the flexure pin respectively having a hole and an aperture aligned with one another; and
a retainer pin arranged in the hole and the aperture with the retainer pin in an interference fit relationship with at least one of the hole and the aperture.

13. The fan drive gear system of claim 12, wherein the hole has first and second ends, the first and second ends being accessible from an outside diameter of the carrier.

14. The fan drive gear system of claim 13, wherein the hole has a first diameter on the first end and a second diameter on the second end, the second diameter being less than the first diameter.

15. The fan drive gear system of claim 14, wherein the first diameter is greater than a diameter of the retainer pin at room temperature and the second diameter is less than the diameter of the retainer pin at room temperature.

16. The fan drive gear system of claim 12, wherein the retainer pin has an end that abuts a stop in the aligned hole and aperture to prevent axial movement of the retainer pin in one direction.

17. The fan drive gear system of claim 12, wherein the carrier supports multiple circumferentially spaced intermediate gears and the torque frame has multiple circumferentially spaced projections secured to the carrier.

18. A fan drive gear system comprising:
a carrier;
an intermediate gear supported by the carrier;
an input gear supported by the carrier;
a ring gear surrounding the input gear;
a torque frame having a projection, the torque frame projection being fixed to the carrier with a flexure pin, the carrier and the flexure pin respectively having a hole and an aperture aligned with one another;
a retainer pin with a diameter arranged in the hole and the aperture; and
a fastener arranged in the hole to secure the retainer pin.

19. The fan drive gear system of claim 18, wherein the hole has a first end with a first diameter to accept the fastener, and a second end with a second diameter to accept the retainer pin, the second diameter being less than the first diameter.

20. The fan drive gear system of claim 19, wherein the second diameter is less than the diameter of the retainer pin at room temperature.

21. The fan drive gear system of claim 18, wherein the carrier supports multiple circumferentially spaced intermediate gears and the torque frame has multiple circumferentially spaced projections secured to the carrier.

22. A method of assembling a fan drive gear system torque frame and carrier, comprising the steps of:
a) axially aligning an aperture formed in a flexure pin with a hole formed in a fan drive gear system carrier;
b) inserting a retainer pin into the aligned hole and aperture and
c) securing a fastener into a first end of the aligned hole and aperture subsequent to performing step b).

23. The method of claim 22, wherein step c) is accomplished by separately threading the fastener into the first end of the aligned hole and aperture subsequent to performing step b).

24. The method of claim 22, wherein the step of inserting the retainer pin provides a slip fit relationship between the retainer pin and the fan drive gear system carrier.

* * * * *